United States Patent [19]
Queensbury

[11] Patent Number: 5,519,378
[45] Date of Patent: May 21, 1996

[54] MOTORCYCLE TURN SIGNAL OVERRIDE

[76] Inventor: Alvin Queensbury, 2210 Presstman St., Baltimore, Md. 21216

[21] Appl. No.: 181,895

[22] Filed: Jan. 10, 1994

[51] Int. Cl.⁶ .................................................. B60Q 1/26
[52] U.S. Cl. ...................... 340/475; 340/472; 340/474; 180/315; 200/61.27
[58] Field of Search .................................. 340/432, 472, 340/474, 475; 180/315; 362/72; 200/61.27, 61.28, 61.54, 61.85, 61.88

[56] References Cited

U.S. PATENT DOCUMENTS

| | | | |
|---|---|---|---|
| 2,790,157 | 4/1957 | Gest et al. | 340/432 |
| 3,733,583 | 5/1973 | Ukai | 362/72 |
| 3,950,727 | 4/1976 | Smith | 362/72 |
| 4,290,048 | 9/1981 | Cutlip et al. | 340/432 |
| 4,320,906 | 3/1982 | Saunders, IV | 362/72 |
| 4,559,516 | 12/1985 | Schott | 340/432 |
| 4,641,723 | 2/1987 | Takanashi et al. | 180/315 |
| 4,710,599 | 12/1987 | Motodate et al. | 200/61.85 |
| 4,760,372 | 7/1988 | Watson | 340/432 |
| 4,975,623 | 12/1990 | Iketqni | 340/475 |
| 5,023,592 | 6/1991 | Schumacher | 340/475 |
| 5,207,500 | 5/1993 | Rios et al. | 340/475 |
| 5,247,431 | 9/1993 | Zuo Liu | 362/72 |

Primary Examiner—John K. Peng
Assistant Examiner—Edward Lefkowitz

[57] ABSTRACT

A a three-pole toggle switch intended for mounting upon the handlebar of a motorcycle proximate one handlebar grip and wiring enabling connection to the electrical system of a motorcycle allows control of the turn indicator signals. With proper installation the wiring of the motorcycle is supplanted, and the device functions as an override control of the turn indicator system. This device is intended particularly for systems requiring constant application of pressure upon a button contact to maintain activation of a turn signal which action precludes the use of either the clutch or the front brake and control of the throttle during use of the turn signal, depending upon whether the left or right side indicator, respectively, is employed. An appropriately wired and positioned device enables the rider to activate and maintain activation of either turn indicator by positioning of the toggle without restriction to the use of either hand. The toggle position is readily determined by feel, and operation with one finger readily facilitated. In addition, an audio device may be wired such that an audio signal is activated by activation of either indicator, serving as a reminder that a turn signal is 'on'.

11 Claims, 3 Drawing Sheets

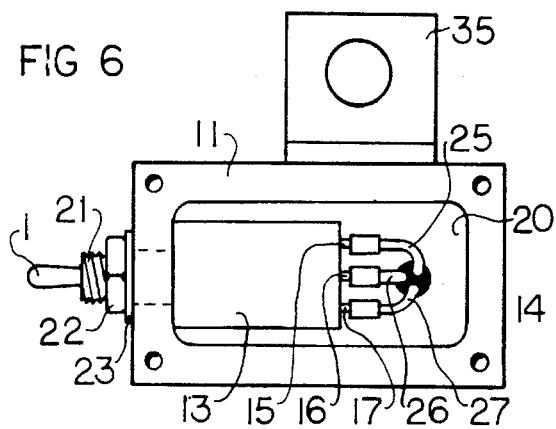
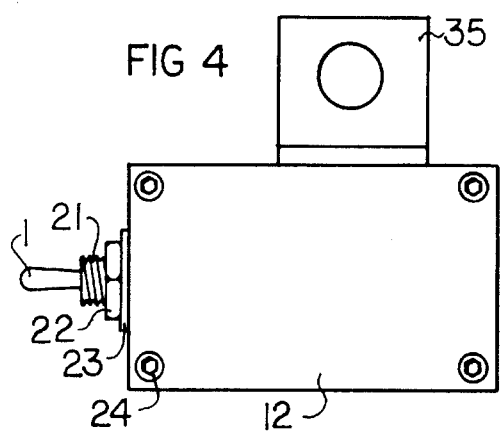
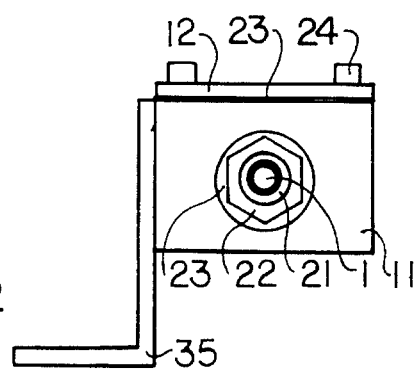
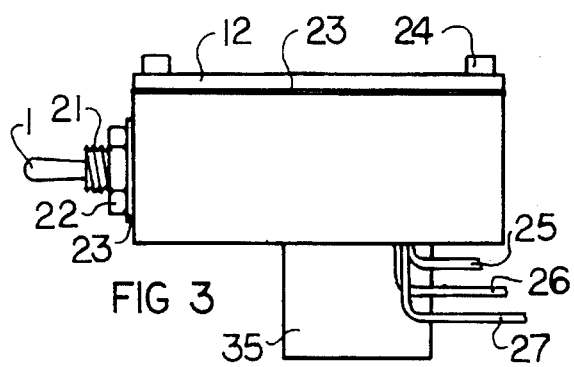
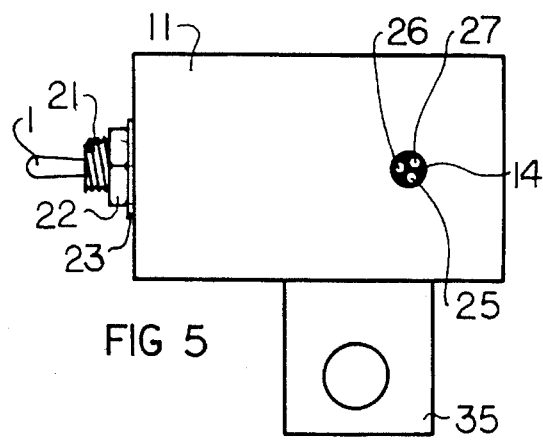

MOTORCYCLE TURN SIGNAL OVERRIDE

BACKGROUND OF THE INVENTION

1. Field of the Invention

The present invention relates generally to devices intended to control the activation of turn indicators on motorized two wheeled vehicles, hereafter called 'motorcycles' and more specifically to the field of devices which are intended to function as an auxiliary control for activation of turn indicators on motorcycles, particularly with the use of a single three pole toggle switch.

2. General Background of the Invention

Various manufactures of motorcycles employ various means of effecting activation of the right and left turn indicators found on most larger models. Among these various means exists a particular method and associated apparatus requiting the exertion of pressure upon one of two pressure contact, resilient 'buttons', located upon the handlebars, one proximate either handgrip. This particular system requires constant pressure upon the right side button for activation of the right side indicator and constant pressure upon the left side button for activation of the left side indicator. This requirement impedes the full use of either the right or left hand during the period in which activation of a turn signal is desired and effectively prohibits the use of the control lever upon the side concerned during use of the signal as well as the throttle during use of the right signal. If the left side signal is to be 'on' the use of the left side control lever, which engages the clutch and is necessary for change of gear, is effectively denied. If the right side signal is to be 'on' the use of the right side control lever, which controls the front brake, is effectively denied as is control of the throttle, which is effected by twisting the right handgrip.

3. Statement of Need

The rider of a motorcycle possessing a system requiring constant pressure contact to maintain activation of either of the two turn indicators typically desires activation of either signal throughout the entire duration of a particular manoeuver for which the signal is appropriate and further desires the full use, without impediment, of the front brake, the clutch and the throttle throughout the same. Indeed, there is no small loss of safety to riders of motorcycles possessing such a system in being forced to choose between continued activation of the left side turn signal and the use of the clutch and between the continued activation of the right side turn signal and the either use of the front brake or control of the throttle. A poignant need therefore exists for a device which would allow the full use of both hands during the period in which the rider of a motorcycle possessing an indicator control system of the type described above desires continued turn signal activation.

SUMMARY OF THE INVENTION

The present invention comprises a device intended to supplant the existing system for the activation of turn signals upon motorcycles. Said device is comprised of a three pole toggle switch, means of mounting said toggle switch and appropriate wiring which can be connected to the pre-existing electrical system to effect an override control of the pre-existing turn signal control system. The means of mounting the toggle switch may further include a housing for said toggle switch which may further be moisture resistant. It is intended that the toggle switch be mounted proximate either handlebar grip, or handgrip, of a motorcycle located such that the rider may control the position of the toggle with the extension of a single finger, without release of the grip. The toggle switch possesses first, second and third distinct positions. When appropriately wired, said first position enables and maintains activation of the left turn signal by supply of power to the left indicator, said second position enables and maintains activation of the right turn signal by supply of power to the right indicator, and either turn signal is deactivated with the toggle in said third position. It is further suggested that an audio device be wired such that an audio signal is activated by the supply of power to either turn signal. Activation, continuance of activation and deactivation of either turn signal is thus determined by the position of the toggle and maintenance of either turn signal activation may be effected without any impediment to the full use of either hand.

BRIEF DESCRIPTION OF THE DRAWINGS

FIG. 2 is a plain elevational view taken from the front of a device illustrating a preferred embodiment of the principles relating to the present invention.

FIG. 3 is a plain elevational view taken from one side of a device illustrating a preferred embodiment of the principles relating to the present invention.

FIG. 4 is a plain elevational view taken from the top of a device illustrating a preferred embodiment of the principles relating to the present invention.

FIG. 5 is a plain elevational view taken from the bottom of a device illustrating a preferred embodiment of the principles relating to the present invention.

FIG. 6 is a plain elevational view taken from the top of the device shown in FIGS. 2–5 without the lid illustrating the interior of that device, particularly the connection of the three pole toggle switch to wiring leads.

DETAILED DESCRIPTION OF THE INVENTION

Figure 1:
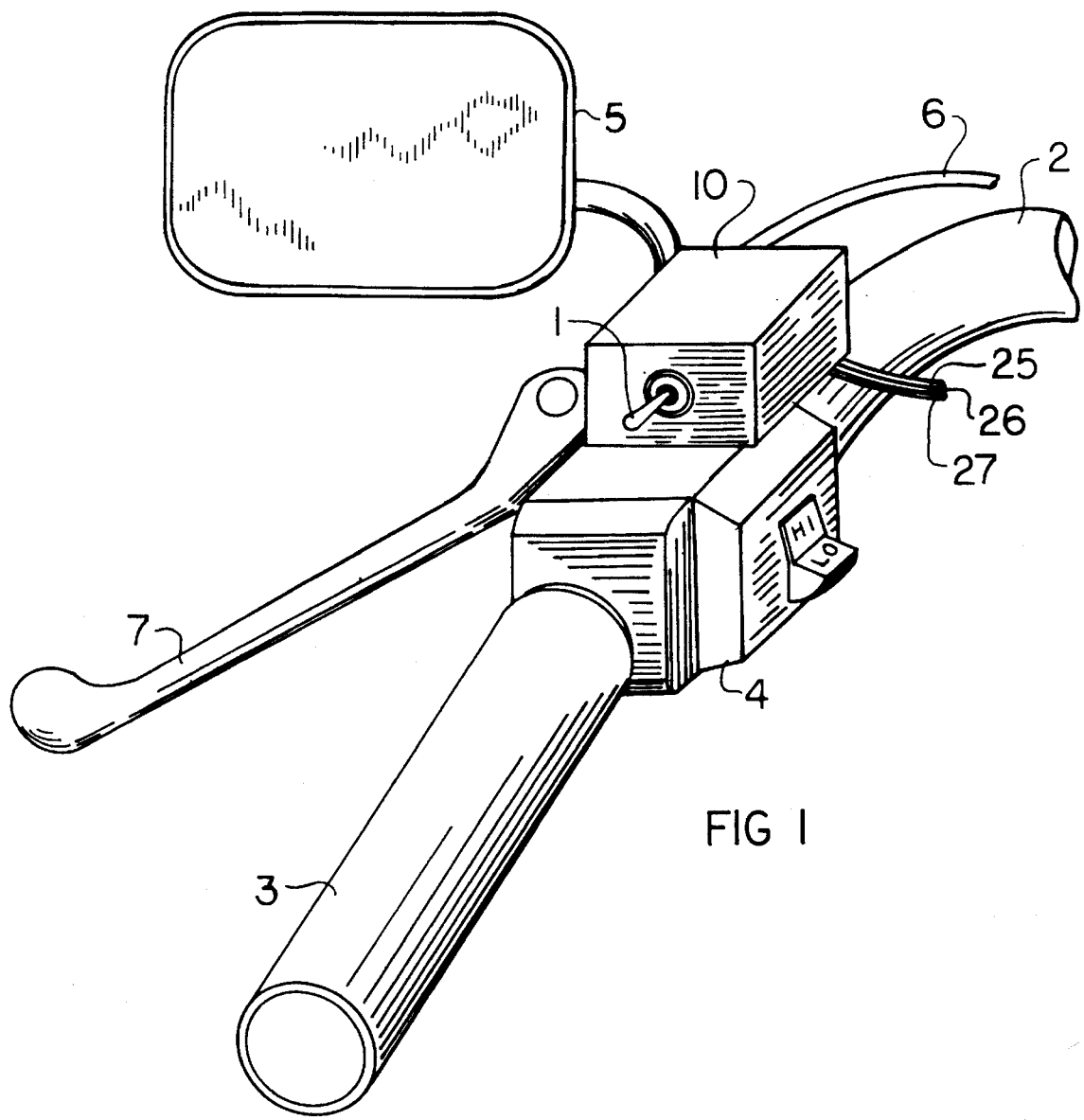
FIG. 1 is a perspective view illustrating a preferred deployment of the present invention upon a motorcycle handlebar proximate one handgrip.

In FIG. 1 an override control 10 with a toggle lever 1 located upon a motorcycle handlebar 2, proximate a grip 3, is shown adjacent the headlamp control 4 and mirror 5. The control cable 6 and control lever 7 upon this side are also clearly depicted. It should be readily apparent from the perspective view illustrated in FIG. 1 that the toggle lever 1 of the override control 10 is readily manipulated by one finger extended from a hand located upon the grip 3 as the distance between the two is no greater than the distance between the control lever 7 and the hand grip 3. Also visible in FIG. 1 are the three lead wires 25, 26 & 27 connecting the override control 10 to the pre-existing motorcycle wiring.

The construction of a preferred embodiment of the principles relating to the present invention is detailed in the plain elevational views given in FIGS. 2–6. As shown in FIGS. 2–6, the control is constructed with a base 11, from which the toggle lever 1 and a hollow, threaded shaft 21 protrudes; the toggle lever 1 extending into this shaft is secured to the base 11 by a lock nut 22 which further secures a moisture resistant seal 23 which is, in this case, an annular, collar style gasket. Another moisture resistant seal 23 is shown between the lid 12 which is secured to the base 11 by four bolts 24 which are hexagonal socket head bolts in the case depicted. A moisture resistant seal is also strongly recommended, though not illustrated, for the aperture 14 through which the lead wires 15, 16 & 17 extend, as seen in FIGS. 5 & 6 which depict the bottom and interior views of the device illustrated. A rubber gasket possessing three apertures of appropriate diameter for the lead wires and an overall perimeter correctly sized for the aperture 14 would be best, but other means of moisture resistance, including an appropriate amount of epoxy would serve to form an effective seal here.

The preferred embodiment illustrated in FIGS. 2–6 depicts the most durable construction considered feasible, ie. readily manufactured. The interior 20 of the override control seen in FIG. 6 is, in this case, milled out of a solid block or billet of aluminum alloy and the base 11 is therefore a single piece of corrosion resistant material possessing considerable strength and light weight. The base 11 in this case is drilled and tapped, as seen in FIG. 6, for the four bolts 24 seen in FIGS. 2–4, which secure the lid 12 which is drilled for the same and consists essentially of a solid plate of aluminum alloy, in this case. The base and lid together comprise a housing for the toggle switch body 13, seen in FIG. 6, and in conjunction with the attached bracket 35 comprise a preferred means of mounting the toggle switch.

The base 11 shown here is also given a bore through the front wall depicted by the dotted lines shown in FIG. 6 to admit the passage of the threaded shaft 21 and the concentric portion of the collar gasket which is employed in this case as a moisture resistant seal 23 but the diameter of this bore must be small enough to prevent the passage of the lock nut 22 which mates the threaded hollow toggle shaft 21 as shown. As seen in FIG. 6, the toggle switch body 13 is located in the housing interior 20 which is milled out of the base 11 and is secured to the base by the tensile force exerted by the lock nut 22 against the exterior of the base 11 and the threaded toggle shaft 21 which maintains the toggle switch body 13 in abutment against the opposed, interior wall of the base 11.

The toggle switch possesses three poles and hence three leads 15, 16 & 17 shown in FIG. 6 which here denote the left, center and right poles or leads, respectively, or the first, third and second leads in the general case and are connected to the first, third and second lead wires 25, 26, & 27, respectively. The center or third lead or pole 16 is positive and the center or third lead wire 26 is intended to be connected to the power board 30 which is supplied by the battery 31 via the supply line 32, as may be seen in the wiring schematic depicted in FIG. 7. When the toggle lever 1 is in the central or third position, the toggle switch 13 is in a state of open circuit. When the toggle lever 1 is thrown to the left or first position, contact is effected in the toggle switch 13 between the left or first lead or pole 15 and the center or third lead or pole 16. As may be seen in FIG. 7, the left or first lead wire 25 is connected to the left indicator lead wire 38 and the right or second lead wire 27 is connected to the right indicator lead wire 39.

Activation of, or supply of power to, the left indicator 18 by the override control is thus effected by throwing the toggle lever 1 to the left position which effects contact between the center, positive lead or pole 16 and the left lead or pole 15, transmitting current via the left lead wire 25 and the left indicator lead wire 38, through that indicator to ground and such activation continues as long as the toggle lever 1 is in this position. Similarly, activation of the right indicator 19 by the override control 10 is effected by throwing the toggle lever 1 to the right position which effects contact between the center, positive lead or pole 16 and the right lead or pole 17, transmitting current via the left lead wire 27 and the right indicator lead wire 39, through that indicator to ground and such activation continues as long as the toggle lever 1 is in this position.

Figure 7:
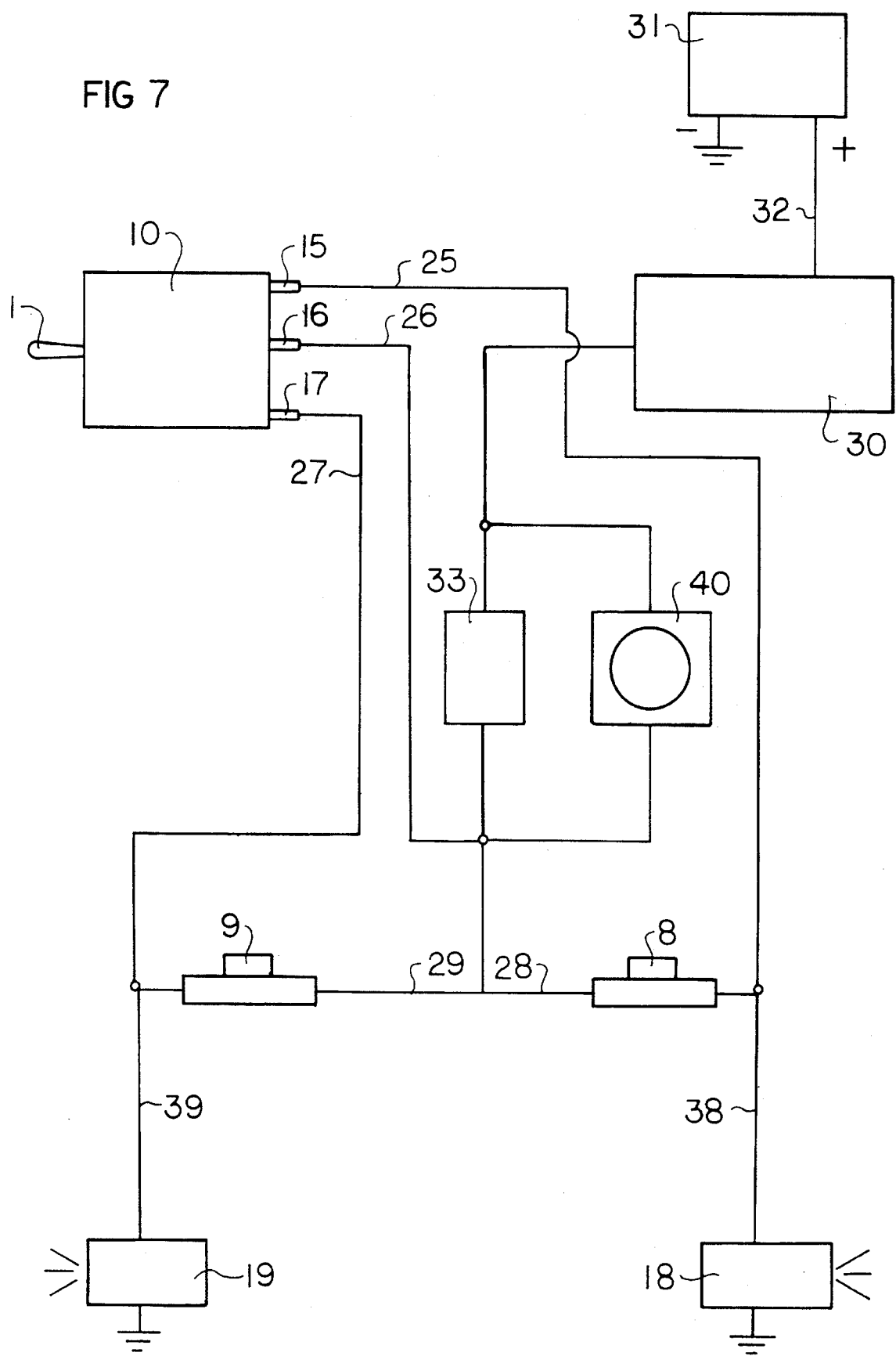
FIG. 7 is a schematic layout of a circuit which illustrates appropriate wiring of a preferred embodiment of the principles relating to the present invention supplemental to pre-existing wiring adequate to effect override control of the turn indicators with the three pole toggle switch.

Activation of either the left or right indicators in accordance with the schematic depicted in FIG. 7, either by the override control 10, or by the contact buttons 8 & 9 will also activate the audio device 40 since said audio device is wired in parallel to the flasher 33 through which both contact buttons obtain power via the contact button lead wires 28 & 29 and the override control obtains power via the positive lead wire 26 which is connected to the wire from the flasher supplying the contact button lead wires. In either case, ground is found through either indicator via the indicator lead wires 38 or 39. The audio device is expressly optional and while obviously of use as a reminder that an indicator has been left on, which is possible only through the override control, is also useful in assuring that electrical contact through the contact button employed is being effected while depressed.

The detailed description above is mainly concerned with one preferred embodiment of the principles related to the present invention. One aspect of the present invention, however, is largely lacking in the discussion above. The means of mounting the override control 10 consists, in this particular case, of a bracket 35 clearly seen in profile in FIG. 2 and visible in the other plain elevational views, FIGS. 3–6. This L-shaped bracket is attached to the base 11 by means of two or more machine screws, the bracket further being counterbored for standard beveled head screws and the base drilled and tapped appropriately for the same. Also shown in FIGS. 4–6 is a bore through the bracket which is intended to admit passage of the shaft of the mirror 5 seen in FIG. 1, and secured by the lock nut with which the mirror is equipped, thus taking advantage of the mounting means employed for the mirror as original equipment.

This specific means of mounting is obviously particular to use of a shaft mounted mirror and indeed the entire preferred embodiment of the principles relating to the present invention illustrated in the attached drawings and described in detail herein is intended for a particular manufacture and model of motorcycle. The popularity of this particular model, despite the fact it is no longer manufactured in this particular configuration, justifies a rather highly specialized adaptor as a valued innovation. The present inventor developed the present invention depicted in the attached drawings and discussed in detail above with one particular motorcycle manufacture and model in mind. This is not to say, however, that the function of the present invention is limited to a particular manufacture and model of motorcycle, but that the principles of the present invention follow from the innovation which addressed a very particular set of circumstances.

Many of the specific features represented in the drawings and discussed above are not necessary for fulfillment of the intended function or principles relating to the present invention. It is not necessary that the toggle switch, central to the present invention, be housed in a rigid structure. A 'naked' toggle switch, possessing means for appropriate mounting and wiring, will fulfill the principles relating to the present invention. If moisture resistance is desired, an appropriate application of epoxy covering the bare leads of the toggle switch and the connection with each lead wire will serve to largely fulfill this desire. Lead wires possessing resilient plastic sleeves which cover the bare leads will also suffice.

A housing is not necessary, it is simply a part of the preferred embodiment depicted, for reasons both functional and aesthetic.

As the entire housing is not strictly necessary though it is considered quite useful, the manner of making the housing is considered to be purely exemplary as regard fulfillment of principles related to the present invention. Moisture resistance is considered an obviously desirable characteristic of an electrical device exposed to open air. It is not essential to the present invention but will provide obvious usefulness in increasing the durability of a device embodying the principles of the present invention. Similarly, a rigid shell type construction housing the toggle switch is useful in protecting the switch and lead connections from physical impact though this obviously useful function is not necessary to fulfillment of the principles relating to the present invention. Moreover, this obviously useful objective may be achieved by other means than that depicted. A shell comprised largely of a cylinder, for example, would serve well in this regard.

The preferred embodiment of the principles relating to the present invention depicted in FIGS. 2-6 was developed with a particular application in mind and the construction depicted therein is, among other objectives, intended to conform, aesthetically, with that particular application. The three non-standard components requiring machining for construction: the base, lid and bracket, are further intended to be given an exterior finish, preferably by anodization, to achieve an uniform matte black appearance. This obviously aesthetic refinement may be extended into a larger rationale for the method of construction chosen. Other than the base, lid and bracket, the device represented may be constructed from standard components. This enables not only ease in manufacture but also ease in maintenance or repair by the operator of the motorcycle. Were the toggle switch hermetically encased in epoxy resin, the twin goals of moisture resistance and protection from impact would be largely fulfilled but replacement of the toggle switch would be rather difficult.

It is seen therefore that the preferred embodiment discussed herein and depicted in the attached drawings exemplifies a certain philosophy which is a commonplace among the operators of the particular motorcycle model which is addressed. It is felt, philosophically, that durability, ease of repair and simplicity are of the highest importance in regard to any piece of equipment on the motorcycle. It is well known throughout the general field of mechanics that a single, solid block or billet of metal is superior in most regards to an assembly. The base depicted herein could be cast in a single, solid piece and achieve the superior qualities associated with a machined block, however, casting is expensive, particularly to duplicate. A replacement base for the device depicted could readily be machined in any machine shop given the necessary information, virtually anywhere in the modern world while a cast replacement would be problematic.

For this reason, a molded plastic shell which would incorporate means of mounting to a position proximate a motorcycle handlebar grip is not depicted nor advised although it would serve to fulfill certain principles related to the present invention. Moreover, the principles relating to the present invention may be applied to the requisite circumstance, that of pre-existing indicator control, in other particular cases wherein other means of mounting as well as all other details of construction, may be more appropriate. Aluminum alloy is recommended for construction of the body of the device depicted because it is corrosion resistant, durable and relatively light, compared with steel. A magnesium alloy possesses all these virtues as well but is comparatively expensive as well as having the unfortunate characteristic of burning under conditions aluminum does not. A body constructed of formed steel is easily imagined but moisture resistance becomes problematic. In addition to the black anodization suggested, polishing or burnishing of the exterior body surfaces is considered eminently suitable for an aluminum alloy construction. If steel were employed, a chrome plating of the exterior would be recommended.

Finally, it is recommended that the lead wires 25, 26, 27 each of which possesses one free end be given a standard termination which is crimped to another wire in effecting an electrical connection. This style, well known in the current market though not depicted in the attached drawings, further possesses a resilient, flexible plastic sleeve which effects a moisture resistant barrier enveloping the connection. Other means of connection, such as soldering and covering with an epoxy resin would function well but require more time and effort in installation.

Further variations in design and construction will not be explored in detail, but the limit to such variation is considered to be determined by the guiding principle that the present invention is an override device, an adjunct or auxiliary control employing a three pole toggle switch intended for wiring to a pre-existing indicator control requiring constant pressure upon a contact for continued activation of a turn signal. The main purpose of the present invention is to provide a means of maintaining the activation of a turn signal without impeding the full use of either hand for the operator of a motorcycle possessing the pressure contact indicator activation system described. It is further the purpose of the present invention to provide such means in the form of an adaptor to pre-existing indicator controls which are left operable after installation of the device described herein.

As regards the wiring of the device described herein to the pre-existing electrical system of a motorcycle possessing turn signal controls, it is not necessary that the pre-existing controls be of the pressure contact style described, nor that the wiring be connected as shown in FIG. 7. The schematic shown therein is considered to be the simplest and therefore best circuit known which will effect the electrical connections necessary to perform the desired functions. It has been tested in the precise form depicted and functions exactly as described. Obviously, there are many other ways in which the device described herein may be electrically connected to a pre-existing motorcycle electrical system in order to obtain the same or substantially similar operation. Since the present invention is an auxiliary device, intended for installation by the owner or operator of a given motorcycle, it is totally infeasible to require any particular wiring arrangement as a part of the invention; it may only be recommended.

It is emphasized, therefore, that the preferred embodiment of the principles relating to the present invention described herein, including the circuit wiring detailed in FIG. 7, is not to be construed as being in any way restrictive of the innovation for which protection by Letters Patent is hereby claimed.

I claim:

1. A device intended to override the pre-existing turn signal indicator controls on a motorcycle possessing left and right turn indicators, a handlebar possessing two opposed handgrips, and a pre-existing electrical system including a power board supplied with power by a battery, a left turn indicator lead wire and a right turn indicator lead wire, said device comprising:

a three pole toggle switch, mounting means and appropriate electrical wiring connected to said toggle switch;

said toggle switch comprising an electrical switch possessing a body, first, second and third poles controlled by a toggle lever protruding from said body, said electrical switch further possessing first, second and third leads electrically connected to said first, second and third poles, respectively, and said toggle lever possessing first, second and third, separate, distinct positions which determine the existence of electrical contact between said first, second and third poles, said first position effecting a condition of open circuit in the toggle switch wherein no electrical contact exists between any two of said first, second and third poles, said second position effecting an electrical contact between said first pole and said second pole and said third position effecting an electrical contact between said first pole and said third pole;

said mounting means being capable of effecting mounting of said toggle switch in a fixed relation to said motorcycle handlebar locating said toggle switch proximate one of said two opposed handgrips of said handlebar such that said toggle lever is within reach of an extended finger from a hand grasping said one handgrip;

said appropriate electrical wiring connected to said toggle switch comprising first, second and third lead wires each possessing a connection effecting an electrical contact with one of said three leads, said first lead wire possessing electrical contact with said first lead, said second lead wire possessing electrical contact with said second lead and said third lead wire possessing electrical contact with said third lead, each of said first, second and third lead wires further possessing one free end capable of being electrically connected to the pre-existing electrical system of the motorcycle such that said first lead wire is connected to power board and thus to the power supplied by said battery, said second lead wire is connected to said left turn indicator lead wire and said third lead wire is connected to said right turn indicator lead wire;

with said three lead wires so connected and said toggle switch mounted proximate said one handgrip, the electrical connection between power and both left and right indicators is in a state of open circuit when said toggle lever is in said first position, supplies power to the left indicator when said toggle lever is in said second position and supplies power to the right indicator when said toggle lever is in said third position thus effecting an override control of the pre-existing indicator controls which will selectively maintain a condition of open circuit, activation of the left turn signal and activation of the right turn signal as determined by the position of said toggle lever.

2. The device of claim 1 further including a separate audio device possessing the capability of electrical connection to said pre-existing electrical system such that activation of said audio device is effected by the supply of power to one of said right and left indicators thereby emitting an audio signal during activation of one of said left and right indicators.

3. The device of claim 1 wherein said mounting means further includes a rigid body fixedly connected to said toggle switch.

4. The device of claim 3 wherein said rigid body further effects an enclosure of said body and said first, second and third leads of said toggle switch.

5. The device of claim 4 wherein said toggle switch possesses a threaded shaft extending through an aperture in said rigid body and a nut mating said threaded shaft is located in communication with an exterior surface of said rigid body and said toggle switch, thereby effecting a fixed connection of said toggle switch to said rigid body.

6. The device of claim 4 wherein said enclosure of said toggle switch body and first, second and third leads is substantially moisture resistant.

7. The device of claim 6 further including at least one seal comprised of a resilient material as a means of effecting moisture resistance.

8. The device of claim 4 wherein said rigid body comprises a housing consisting of a machined from shell of a block of aluminum alloy and an attached aluminum alloy lid.

9. The device of claim 8 wherein said rigid body further includes an L-shaped bracket having a lower portion substantially perpendicular an upper portion which is rigidly fixed to said machined shell, said lower portion possessing a through bore.

10. The device of claim 9 further including anodized exterior surfaces of said housing.

11. The device of claim 9 further including polished exterior surfaces of said housing.

* * * * *